United States Patent
Murphy

(10) Patent No.: US 7,861,793 B2
(45) Date of Patent: Jan. 4, 2011

(54) STABILISING AND RELEASE SYSTEM FOR AND BOOM HOLDING AND POSITIONING SYSTEM FOR AN AGRICULTURAL APPARATUS

(76) Inventor: Richard Murphy, Robinstown House, Glenmore, Via Waterford (IE)

( * ) Notice: Subject to any disclaimer, the term of this patent is extended or adjusted under 35 U.S.C. 154(b) by 752 days.

(21) Appl. No.: 11/572,336

(22) PCT Filed: Jul. 26, 2005

(86) PCT No.: PCT/IE2005/000077
§ 371 (c)(1),
(2), (4) Date: Jan. 19, 2007

(87) PCT Pub. No.: WO2006/011125
PCT Pub. Date: Feb. 2, 2006

(65) Prior Publication Data
US 2007/0246566 A1    Oct. 25, 2007

(30) Foreign Application Priority Data
Jul. 26, 2004    (IE) ............................... S2004/0499
Aug. 18, 2004   (IE) ............................... S2004/0551

(51) Int. Cl.
*A01B 49/00*    (2006.01)
*A01B 59/043*   (2006.01)

(52) U.S. Cl. ....................... 172/311; 172/439

(58) Field of Classification Search ................. 56/14.7, 56/14.9, 15.3, 15.5, 15.7, 15.9, 16.8, 15.8; 172/311, 456, 457, 674, 776, 439, 272, 273, 172/275, 810, 817; 239/146, 159–170, 172
See application file for complete search history.

(56) References Cited

U.S. PATENT DOCUMENTS

| 4,529,129 | A |   | 7/1985  | Ballu et al. |
| 4,561,591 | A | * | 12/1985 | Ballu ........................... 239/159 |
| 4,598,830 | A | * | 7/1986  | Fletcher ...................... 239/166 |
| 4,834,249 | A | * | 5/1989  | Dahl ............................ 212/272 |
| 5,222,614 | A | * | 6/1993  | Ballu .......................... 212/347 |
| 5,375,757 | A | * | 12/1994 | Covill .......................... 228/46 |
| 5,630,547 | A | * | 5/1997  | Klemenhagen et al. ..... 239/161 |
| 7,249,448 | B2 | * | 7/2007 | Murphy et al. ............... 56/15.8 |

(Continued)

FOREIGN PATENT DOCUMENTS

DE    4140254 A1    6/1993

(Continued)

*Primary Examiner*—Robert E Pezzuto
(74) *Attorney, Agent, or Firm*—David A. Guerra

(57) ABSTRACT

A stabilising and release system, for an agricultural apparatus having a mounting portion for mounting the apparatus to a tractor, a pendulum mounted on the mounting portion, and a boom for spraying or cutting, which is pivotally mounted to the pendulum at a pivot point so as to allow pivoting of the boom relative to the pendulum. The system stabilises the boom against movement imparted to it by disruptive forces which disturb the natural position of the boom by proving a rigid damper arranged between the support frame and the boom and arranged to damp relative movement of the boom and the mounting frame caused by disruptive forces, the damper has an articulated coupling which allows the damper to articulate so that the damper can follow the motion of the boom thus damping any undesired swaying action caused by bumps and ruts over which the tractor passes.

20 Claims, 9 Drawing Sheets

U.S. PATENT DOCUMENTS 7,429,003 B2 * 9/2008 Thompson et al. .......... 239/167

FOREIGN PATENT DOCUMENTS

| | | | |
|---|---|---|---|
| EP | 343547 | A | 11/1989 |
| EP | 1167095 | A | 1/2002 |
| FR | 2520264 | A | 7/1983 |
| FR | 2559686 | A | 8/1985 |
| FR | 2619676 | A | 3/1989 |
| FR | 2654574 | A | 5/1991 |
| FR | 2813212 | A | 3/2002 |
| GB | 2014834 | A | 9/1979 |
| GB | 1588426 | A | 4/1981 |
| WO | 03005799 | A | 1/2003 |

* cited by examiner

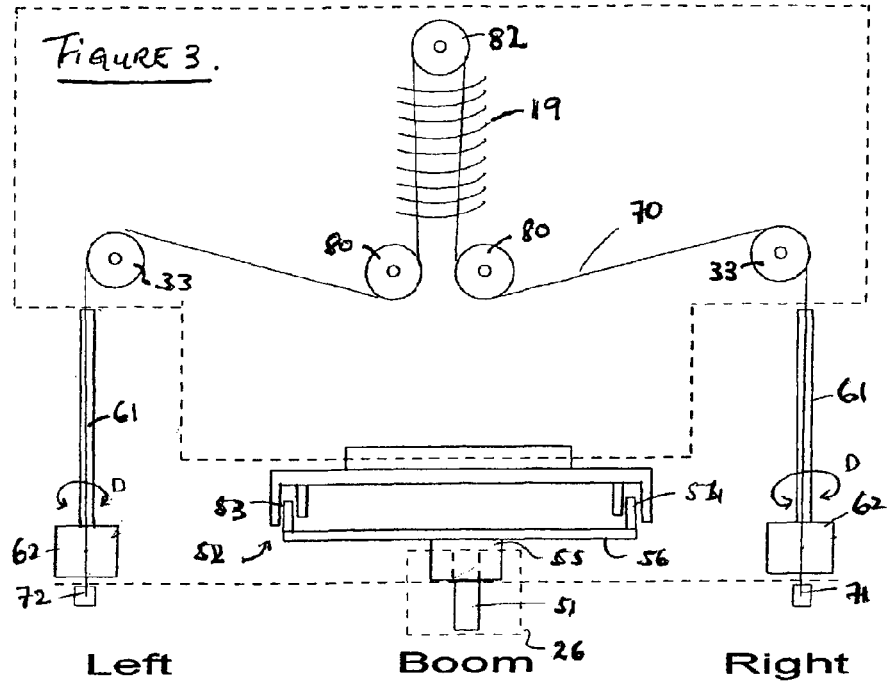
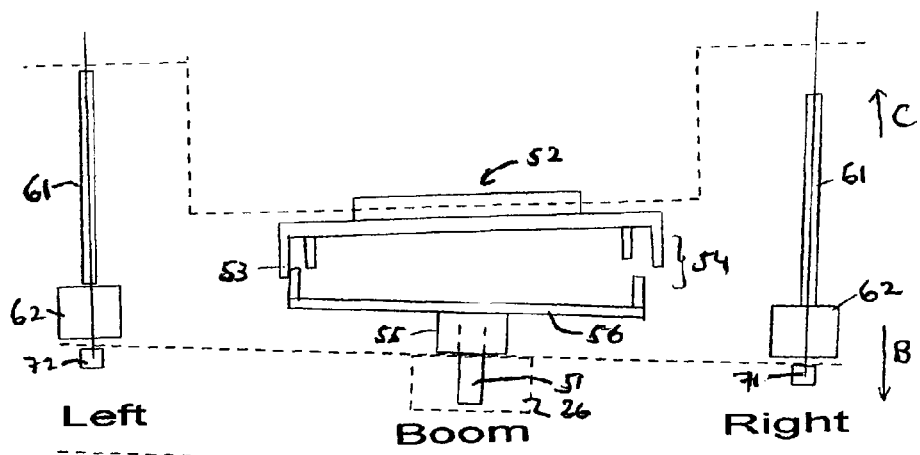

STABILISING AND RELEASE SYSTEM FOR AND BOOM HOLDING AND POSITIONING SYSTEM FOR AN AGRICULTURAL APPARATUS

CROSS-REFERENCE TO RELATED APPLICATIONS

This application is an U.S. national phase application under 35 U.S.C. §371 based upon co-pending International Application No. PCT/IE2005/000077 filed on Jul. 26, 2005. Additionally, this U.S. national phase application claims the benefit of priority of co-pending International Application No. PCT/IE2005/000077 filed on Jul. 26, 2005, Ireland Application No. S2004/0499 filed on Jul. 26, 2004, and Ireland Application No. S2004/0551 filed on Aug. 18, 2004. The entire disclosures of the prior applications are incorporated herein by reference. The international application was published on Feb. 2, 2006 under Publication No. WO 2006/011125 A2.

FIELD OF THE INVENTION

The invention relates to a stabilising and release system for an agricultural apparatus. The agricultural apparatus will typically be adapted for mounting on an agricultural vehicle such as a tractor or the like. Apart from being releasably mountable (such as on a 3 point linkage) the invention may also be employed where the agricultural apparatus is part of the vehicle (generally permanently mounted thereon) such as in dedicated spraying or cutting vehicles. It will be appreciated by those skilled in the art that the term agricultural is not intended to exclude a machine which is used only in off-farm situations, such as in road side maintenance (e.g. spraying or cutting vegetation) or other non-farm applications such as spraying a paved area or the like.

The type of apparatus with which the present invention may be employed are those which have in particular a boom such as the type of boom utilised in spraying and cutting apparatus. The system of the present invention particularly is of interest where the apparatus includes a free hanging pendulum arrangement, as in general there are difficulties in stabilising such boom arrangements.

BACKGROUND TO THE INVENTION

Within the class of apparatus that has such a free hanging pendulum arrangement are cutting machines typically provided with a plurality of cutting elements and adapted for cutting vegetation, for example at a desired height above ground level so as to avoid cutting short grass or other desirable plants which are shorter than other undesirable plants such as relatively tall weeds. Another type of apparatus of interest is a spraying machine having a plurality of spraying heads and adapted for spraying plants with such as chemicals etc. for example pesticides, herbicides and the like.

Various boom arrangements have been described in many documents, such as in International Application no. PCT/IE02/00097 (WO 03/005799), which is to the present inventor. The arrangement described includes a boom which is pivotally mounted to a pendulum arrangement. The arrangement described by the present inventors in that document is an important one, as it is necessary to ensure that the boom is provided in a stable operating condition such that the vehicle can traverse different terrain conditions without altering the performance of the functionality of the boom for example cutting or spraying. Generally the arrangement described in that document works well to maintain the boom in an orientation generally parallel to the plane of the surface over which the vehicle carrying the apparatus passes. This is particularly important for sloped or uneven terrain.

When a delicately balanced apparatus such as that described in the various embodiments of PCT/IE02/00097 is disrupted from its balanced position, such as by disruptive forces imparted to any part of the apparatus which forces disrupt the boom and/or pendulum position from the natural (equilibrium) position (determined by gravity), it may take a short while for the apparatus to dissipate the disruptive force (e.g. through unwanted boom and/or pendulum movement), during which time the boom may remain in an undesired position, or possibly reciprocally move about (and past) a desired position.

A major cause of such disruptive forces are those imparted by irregular surfaces over which the vehicle is passing e.g. when a wheel of a vehicle passes over a rut, hole or depression in the surface causing the vehicle to lurch to one side and back again, —both actions disrupting the natural position of the boom and in cases where a substantial shock force is imparted a severe rocking of the boom to one side can occur. The boom can then undergo an undesirable see-saw action. This action can cause the boom to catch the vegetation over which it passes and in cases of severe disruptive forces may cause the boom to catch the ground. This means that the boom does not operate at a desired height above the ground and this affects the action carried out by the boom, for example spraying or cutting. For example the whole of the vegetation may not be sprayed because at least a part of the boom is too low, or if cutting, the boom may be too high on one side to cut, and cut too low down on the other side thus cutting into desired vegetation which should not be cut.

While the present inventor has described in PCT/IE02/00097 mechanisms for alleviating this problem there is still a need to provide a stabilising system for such an agricultural apparatus against such disruptive forces.

An additional problem that presents itself whenever a boom of relatively large span is utilised, is prevention of straining/bending out of shape of the boom due to encountered resistance forces. This is a difficult task particularly where the boom is to be free to move under gravitational forces. Typically the resistance forces arise in two circumstances—the first due to the boom catching on something, e.g. catching a fence, gate post, hedge or becoming entangled in vegetation being part of a crop or otherwise; and the second due to its own inertia e.g. the moment it experiences about a fulcrum point when the vehicle carrying it changes velocity, for example by a sharp increase in speed or due to turning the vehicle relatively sharply.

There is also a need to protect such a boom from being damaged by such resistance forces. It will be appreciated by those skilled in the art that the boom could be bent out of shape by such forces.

Furthermore when a large span boom such as that described above is in its working or floating position it can be difficult to maintain the boom in a desired orientation relative to the ground or vegetation over which it passes. The system (for example as described in the above referenced International application) allows the boom to move transverse to the direction of travel of the tractor in what could be described as a floating position. The system is very effective in the operating position however there are times when the system can be difficult to control. An example of this is when the machine is working in a field with a slope, turning at the end of the run or headland to work back in the opposite direction. A lot of adjustment is required and this can be quite slow because of the floating nature of the boom and system.

For example if working on the side of a hill where one side of the vehicle is lower on the slope of the hill than the other, turning on the hill to work back along the field parallel to the portion of the field just worked (a previous pass), will involve a large amount of adjustment of the boom angle, as the angle of the boom will need to be reversed to allow movement of the boom along the field in an opposing direction. For example, if the boom is angled at say 30° to the horizontal with a left arm or side of the boom at a lower position and a right side or arm of the boom at a higher position in order to allow working on the side of a hill, then, to reverse direction, the boom will generally have to be reversed so that the right arm or side is lower and the left side is higher. In the example given (where the slope of the hill is the same for the next pass) the boom will have to be moved through 60°, to be tilted at 30° in the opposite way. Such adjustment may have to be done by an operator while turning on a headland of a field. This adjustment can be difficult particularly while at the same time the vehicle must be turned to make the next parallel pass in the opposing direction.

OBJECT OF THE INVENTION

It is an object of the present invention to provide a stabilising system for stabilising a boom arrangement which is free-hanging (moves under the force of gravity), and in particular those of the type mounted on a free-hanging pendulum such as those described herein and in PCT/IE02/00097. It is also an object of the invention to protect such a boom from being damaged by resistance forces such as those described above. It is further desirable to provide a holding or stabilising system for a free hanging pendulum type system such as described in PCT/IE02/00097 for example when the machine is turning at the end of a run or on the headland.

SUMMARY OF THE INVENTION

The present inventor has provided a stabilising system, for an agricultural apparatus,
the agricultural apparatus having
a mounting portion for mounting the apparatus to a vehicle,
a pendulum mounted on the mounting portion, and
a boom which is pivotally mounted to the pendulum at a pivot point so as to allow pivoting of the boom relative to the pendulum,
the stabilising system for stabilising the boom against movement imparted to it by disruptive forces which disturb the natural position of the boom and comprising:
a rigid damper arranged between the mounting portion (support frame) and the boom and arranged to damp relative movement of the boom and the mounting frame caused by said disruptive forces, the damper including at least one articulated coupling which allows the damper to articulate with respect to at least one of the mounting frame and the boom so that the damper can follow the motion of the boom.

Generally the system of the present invention has been found by the present inventor to work extremely well to damp erratic movements of the boom imparted by disruptive forces such as sudden shock while not interfering to any substantial extent with the balance of the boom.

The apparatus can take the form of those generally described in PCT/IE02/00097 the entire contents of which are hereby incorporated by reference into the present application.

Of particular interest to the present inventor, and forming an aspect of the present invention that may be used independently of other aspects of the present invention or together with one or more aspects of the present invention, is an apparatus of the type which comprises:
a mounting portion including at least one vertical support, the support being non-pivotable or pivotable to the mounting frame,
a pendulum having a first end suspended from the vertical support by an arched roller arrangement, and a second end on which a pivotable boom is mounted, a pendulum pivot arranged at a position between the first and second ends of the pendulum which pivotally connects the pendulum to the vertical support,
the arched roller arrangement and the pendulum pivot being arranged to cooperate so as to allow gravitational swinging of the pendulum by simultaneous arched roller arrangement movement and pivoting about the pendulum pivot, and
a boom pivotally attached to the second end of the pendulum.

Such an apparatus gives a particularly well defined, and regular pendulum motion, which is less easily upset than that of other constructions, for example by movement of the vehicle carrying the pendulum. This is due at least in part to the presence of the pendulum pivot. Generally the vertical support will be adjustable to allow alignment of the vertical support with the pendulum if desired. The term vertical support includes any support such as a frame which extends vertically and which is arranged so as to support the top end of a pendulum so that the pendulum can be hung therefrom.

In all aspects of the present invention it is desirable that the pendulum is of a fixed length. This is desirable as having a pendulum which can change length may cause a problem due with maintaining the balance of the boom.

The pendulum within the apparatus described above is considered to be free hanging notwithstanding the fact that the pendulum pivot is provided. The pendulum pivot acts to govern or regulate the pendulum motion (again against disruption due to disruptive forces imparted to the pendulum). The term free hanging thus includes the pendulum arrangement of the apparatus described above.

The pivotal connection between the arched roller arrangement and the vertical support can be a direct or indirect connection. For example, the pivotal connection can be provided by a pivot pin extending between the vertical support and the pendulum (forming a direct connection). Alternatively, the pivotal connection can be provided between a pivot point on the pendulum which is indirectly connected to the vertical support. For example, the pivot point may be connected to the vertical support by one or more rigid members which connect to the vertical support (indirectly connecting the pendulum to the vertical support). For example the rigid member(s) may connect the pendulum pivot to at least one rigid damper of a stabilising system as described above.

In relation to the stabilising system of the present invention, the damper may comprise a rigid shaft which is free to articulate, for example at one or both ends. In particular it is desirable that the shaft is arranged so that the articulation point is substantially aligned with a longitudinal axis of the shaft. It is desirable that the shaft articulates about one or both of its ends. The skilled person will however appreciate that the articulated coupling can be provided at any point along the shaft.

It is desirable that the shaft extends from the mounting portion to the boom in a direction substantially perpendicular to the longitudinal axis of the boom. (The longitudinal axis of the boom will generally be transverse to the direction of travel.)

For example the damper may comprise:
(i) a rigid shaft and the articulated coupling may be provided by a universal joint;
(ii) a rigid shaft and the articulated coupling may be provided by a ball and socket joint; or
(iii) a rigid shaft and the articulated coupling may be provided by a male part of the shaft which is received and can articulate within a female receiver part; or
(iv) a rigid shaft and the articulated coupling may be provided by a flexible or flex coupling such as a tie, deformable joint (e.g. a rubber connector);
and any combination thereof.

Where a rigid shaft is utilised it will appreciated that the rigid shaft itself may articulate about the coupling. The damper may be extendable. In this respect the damper may comprise a piston and cylinder arrangement for example operated by fluid pressure such as hydraulic fluid or air. In this respect, it will be appreciated by those skilled in the art that the articulation required will need to follow the motion of the boom/pendulum arrangement which will necessarily require the coupling(s) to allow freedom of movement to follow the various arcs of (boom) movement in question. Pendulum arc movements involve a combination of movement in horizontal and vertical planes and thus the coupling allows articulation in both these planes also and in particular it is desirable to allow shaft to boom coupling through 360° (in a radial direction perpendicular to the longitudinal axis of the coupling). The coupling can thus act as a swivel.

In effect the boom can move left to right and up and down without any substantial interference from the damper during regular motion of the boom under gravitational forces. Indeed the present inventor has found that an agricultural apparatus according to the present invention works extremely well and without interference from the stabilisers during normal movement of the boom.

However when a sudden shock occurs and the boom (and pendulum) sways rapidly the boom will experience an inertia (a dampening) from the damper to such sudden motions. This inertia will increase as the degree of movement of the boom from its rest position increases, and the tendency then is for the boom (and pendulum) to resume its correct gravitational orientation within a very short period.

The damper thus acts to prevent unwanted swinging (arcuating action) of the boom (and the pendulum) and also acts to return the pendulum to its natural position. In this way the apparatus is stabilised as desired. While shocks to the boom cannot be avoided the effects of same can be minimised utilising the present invention.

It will be appreciated that the boom may generally comprise two arms which extend a substantial distance each side of the vehicle when in use. It is desirable that the arms extend at least 2 metres, preferably at least 3 metres, such as at least 4 metres either side of the vehicle.

It is desirable that a second damper is provided in the same manner as the first. Generally, it is desirable that the first and second dampers are spaced apart, for example provided on opposing sides of the pendulum. A second damper helps to further dampen the boom against disruptive forces (and to maintain the boom in a desired transverse position). The greater the length (reach or span) of the boom the greater the damping force required. Where two dampers are provided a rigid member may extend from the pendulum pivot to each damper (to indirectly connect the pendulum pivot to the vertical support). For example the pendulum pivot is provided between the pendulum and a frame which connects the pivot to the damper(s) and additionally or alternatively to any other point of the vertical support.

Where the boom comprises two arms it is desirable that a damper is provided between the support frame and an arm. Where two dampers are provided it is desirable that each is provided between the support frame and a respective arm. Generally the boom, for example each arm thereof, will have an inoperative position for non-working transport thereof, for example by a mechanism which allows the arms to be turned to a position along the vehicle or by a retracting mechanism such as folding mechanism which reduces the length of the boom. Generally in the working position the boom is substantially transverse to a longitudinal axis (or the direction of travel) of the vehicle.

The stabilising system according to the present invention may further comprise a release system (also referred to as a break-away or kickback system) for releasing the boom from a first (operating) position, to a second (release) position when the boom encounters a resistance to movement above a pre-determined resistance threshold. The release system may comprise:

a release pivot between the boom and the mounting portion for allowing the boom to move from the first position to the second position about the release pivot;

a release coupling for holding the boom in the first position until the pre-determined resistance threshold is reached.

It is desirable that the release coupling is provided by the damper. In such an arrangement the release coupling can be provided by providing a damper which can itself extend such as described above and for example by way of an extendible shaft or as will be described below. In any event it is desirable that the release coupling action of the damper is a biased one, providing for return of the boom to the first position when the resistance force reduces below the threshold.

In use then, when the boom encounters such a resistance to movement which exceeds the threshold, the release mechanism allows the boom to move from a first position which is substantially transverse to the direction of travel, to a second position which may be a folded back (or turned back) position. This helps to avoid damage to the boom by possibly allowing the operator of the machine time to stop the vehicle, allowing the boom to be moved past an obstacle without damage (by breaking away from its normal orientation and then returning), or where the resistance load is due to inertia of the boom, simply to avoid overstraining the boom by allowing it to move away and return. The boom will thus automatically return to the first position. It can be seen therefore that the damper can provide a dual function.

In one preferred arrangement the release coupling comprises a tensioned tie running in a guide element and acting between the boom and the mounting portion and being arranged to allow the boom to move about the release pivot into the second position by allowing additional tie length when the pre-determined resistance threshold is reached. This provides a simple yet reliable construction. The tie is preferably a flexible one. Suitable ties include ropes and cables, including those which are made of natural and man-made fibres, including those constructed of plastics and metallic (e.g. wire rope) materials. The additional tie length is provided between the boom and the mounting portion to allow the movement of the boom in the manner described.

In one embodiment the tie is tensioned by a suitable tensioner such as a spring, e.g. a compression or extension spring, or hydraulic spring arrangement (for example a gas spring). In this respect the additional tie length can be provided by increased tension transmitted to the tensioner so as to compress/extend the tensioner in the appropriate manner.

It is not necessary for the guide to extend and in one simple arrangement a fixed length guide is provided. Indeed the guide can simply held in place by threading of a tie through it i.e. it can be a sliding sleeve. When the movement of the boom toward the second position occurs the guide may simply be held by the tie.

Alternatively or additionally the release coupling may be a telescopic arrangement, for example the shaft could be telescopic. It is also worth noting that if desired, the telescopic motion may be biased, for example utilising a spring. The spring(s) could be fitted over the shaft or held within the shaft. For example, where the boom movement causes extension of the telescopic arrangement, the telescopic motion could be biased against such extension.

In this way a simple, but effective stabilising system can be provided.

Where two or more dampers are provided a single tensioner can be arranged to tension ties to both dampers.

In one arrangement two dampers are provided and a single tensioned tie is employed to allow the required additional tie length as required to either or both dampers.

In one arrangement the guide for the tie is provided by the shaft and in one desirable arrangement the shaft is hollow and the tie runs internally therein.

In one particularly desirable arrangement the tie forms part of the articulated coupling also (together with the guide). The relative movement of a portion of the tie extending within and/or past the guide can flex in the normal way providing the desired articulation.

In a one simple yet highly effective construction the damper is provided by a construction comprising a tensioned tie running from the boom to the mounting frame through a guide in the form of a hollow shaft and through a female receiver part in which a male part of the hollow shaft is received and can articulate.

In this arrangement the shaft can act as a spacer between the boom and the mounting frame and the guide for the tie (which will maintain the tie running along a desired path), while the articulation of the shaft within the female receiver will allow the desired movement of the boom while damping any erratic movement of the boom. It will also provide the second aspect of the dual functionality of the damper by allowing the boom to move under a restoring force.

Opposing ends of a single tie may be utilised in respective dampers within a dual damper arrangement.

The male part of the shaft may be a tapered part thereof e.g. a head portion thereof.

A stop (e.g. a clamp on a tie) may optionally be provided to prevent the tensioned tie retracting too far.

In one aspect as mentioned above the damper may be extendable. As also described above it is desirable that the damper also acts to return the boom to the first position when the resistance force reduces below the threshold. Hydraulic biasing means are mentioned above and include a piston/cylinder or other arrangement where the damper can extend against a bias such as a hydraulic fluid such as, oil or air. For example the damper could comprise a strut which can extend against a bias such as an air pressure. It will be appreciated that the damper may extend along a longitudinal axis thereof, and also that the extension may be achieved by one or more members that are arranged at an angle transverse to the extension direction e.g. extending by scissors action. The action of the damper to return the boom to its working position is desirably a controlled action, for example a damped movement which prevents the boom moving back to the first position too quickly. In particular it is desirable to have a controlled or time delayed return where the boom returns slowly to the first operating position. A suitable type of mechanism to move the boom back to the first position includes the type of biasing mechanisms utilised in closures for doors to close open doors gently.

A further aspect of the present invention, which can be utilised independently of, or in combination with, one or more of the agricultural apparatus or stabilising or retaining systems of the present invention, is a release system for an agricultural apparatus,
the agricultural apparatus having
a mounting portion for mounting the apparatus to a vehicle,
a pendulum mounted on the mounting portion, and
a boom which is pivotally mounted to the pendulum at a pivot point so as to allow pivoting of the boom relative to the pendulum,
the release system for releasing the boom from a first (operating) position, to a second (release) position when the boom encounters a resistance to movement above a pre-determined resistance threshold,
the release system comprising:
a release pivot between the boom and the mounting portion for allowing the boom to move from the first position to the second position about the release pivot; and
a release coupling for holding the boom in the first position until the pre-determined resistance threshold is reached.

This system allows for the boom to retract when it hits an obstacle, or otherwise experiences a force which might otherwise damage the boom, thus preventing such potential damage. The operator will also have the visual warning of the retracting boom to indicate that the progression of the boom is being impeded.

A vertical support will generally form part of the mounting portion of this apparatus.

In a further aspect the present invention provides a holding or retaining system, for an agricultural apparatus,
the agricultural apparatus having
a mounting portion (mounting frame) for mounting the apparatus to a vehicle,
a pendulum mounted on the mounting portion (mounting frame),
a boom which is pivotally mounted to the pendulum at a pivot point so as to allow pivoting of the boom relative to the pendulum, and
a boom stop which is for restricting movement of the boom with the pendulum (pendulum movement) which may take the form of retaining means for (connecting and) holding the boom to the mounting portion (mounting frame) restricting free (pendulum) movement of the boom (relative to the mounting portion).

It will be appreciated that restricting the movement of the boom will restrict movement of the pendulum and vice versa. Again a vertical support will generally form part of the mounting portion of this apparatus. Generally in an operating configuration or working position the boom and pendulum move (together and) freely independently of the mounting portion or frame. In this way the boom and pendulum are free to move in response to gravitational forces. The retaining means acts to restrict this free movement when required.

The present invention thus additionally provides a system for holding the apparatus in position when not in operation. The floating system (free movement) is not required for headland or out of working operation. A more rigid boom stabilising system is desirable for this type of operation. The present aspect of the invention provides same and thus allows for better control of a boom position such as on a slope thus solving the problem (of difficulty of control on turning) outlined above.

Desirably the apparatus includes means for adjusting the angle of the boom relative to the pendulum. A hydraulic ram or the like may be utilised. With a free hanging pendulum the angle of the boom to the pendulum can be adjusted by such adjustment means and must be adjusted slowly so as not to disturb the vertical position of the pendulum.

There are times when a large amount of adjustment of the boom relative to the pendulum will be required for example when turning on a side hill to work in the opposite direction. This is time consuming, and unnecessary as the present inventor has discovered, as the free hanging pendulum or floating system may be only required in the operating i.e. cutting or spraying position.

The aspect of the invention being presently discussed connects and holds the boom to the mounting frame when the machine is not in operation (for example not cutting or spraying). This allows the angle of the boom to the pendulum to be made (set) quickly and accurately with the minimum of interference to the pendulum. This allows a quick and safe turn around when working in the field; this more rigid holding of the boom also makes it easier and safer to carry out any necessary repairs to the boom.

This aspect of the present invention has two positions.

Position one, Working or floating position. There is where the boom is allowed to move freely with the pendulum independent of the frame and also allowing the operator to adjust the angle of the boom relative to the pendulum.

Position two, Stabilised or holding position. This is where the boom is held to the frame, restricting free movement of the boom.

The present aspect of the invention relates mainly to position two.

This may be achieved on the present machine by two roller type mechanism that can be carried for example on the boom, one positioned at either side of the pendulum. Similarly positioned on the frame are two holding mechanisms. When the machine is in the non-working position or holding position, the holding mechanism on both sides of the frame come into contact with the roller type mechanism on either side of the boon thus connecting and holding the boom to the frame. The roller type mechanism connected to the holding mechanism allows limited movement of the boom transverse to the direction of travel but only parallel to the carrier frame.

This aspect of the invention can also be described as a holding or retaining system, for an agricultural apparatus, the agricultural apparatus having
a mounting portion (mounting frame) for mounting the apparatus to a vehicle,
a pendulum mounted on the mounting portion (mounting frame),
a boom which is pivotally mounted to the pendulum at a pivot point so as to allow pivoting of the boom relative to the pendulum, and
a boom stop for stopping pendulum movement of the boom.

For Example the boom stop may comprise a retaining means moveable between (i) a first position which allows free movement of the pendulum and (ii) a second position for preventing free movement of the pendulum.

As above restricting free movement of the pendulum can be achieved by the retaining means, which, by restricting (preventing) movement of the boom will restrict movement of the pendulum, or which will by restricting (preventing) movement of the pendulum which will restrict movement of the boom. In any event the natural (gravitational) pendulum movement is prevented by the retaining means.

It will be appreciated by those skilled in the art, that any suitable retaining mechanism can form the retaining means. Generally the movement of the boom/pendulum will be prevented by coupling the boom and/or pendulum to the mounting portion. Suitable mechanisms include an actuatable coupling or stay which has a first position where it does not interfere with movement of the pendulum and boom. In a second position the stay holds the boom and/or pendulum to the mounting portion and prevents that motion.

This may be achieved by having the stay frictionally engage, for example move to abut the pendulum or boom or move in the opposite way to engage the mounting portion. Alternatively a receiver and holder arrangement may be employed. In one arrangement the stay may interlock with the pendulum or boom or (for example if on the pendulum or boom) with the mounting portion. The retaining means could also comprise a link or tie to the pendulum or boom which link or tie connection between the mounting portion and the pendulum or boom may be tensioned (when desired) to provide the desired restriction on the free movement (in the non-tensioned state free movement is possible).

A vertical support will generally form part of the mounting portion of this apparatus. In such a case it may be desirable to have the retaining means retain the pendulum or boom to the vertical support part of the mounting frame.

A yet further aspect of the invention provides a boom positioning system, for an agricultural apparatus,
the agricultural apparatus having
a mounting portion (mounting frame) for mounting the apparatus to a vehicle,
a pendulum mounted on the mounting portion (mounting frame),
a boom which is pivotally mounted to the pendulum at a pivot point so as to allow pivoting of the boom relative to the pendulum, and
automatic boom positioning means arranged, when actuated in use, where the boom is in a boom tilted position in which position the boom is not perpendicular to either of the pendulum or the frame, to bring the boom from the boom tilted position to a boom non-tilted position where the boom is substantially perpendicular to either of the pendulum or the frame.

This is particularly desirable to allow the operator of the apparatus to move the boom into the non-tilted position without having to continually adjust the boom such as was necessary with other boom systems. Furthermore the operator will not have to take account of whether or not the machine is on level ground.

In one arrangement it is desirable that the boom positioning system also operates as a boom retaining system of the type described above. For example the boom positioning system could, when desired, be arranged to move the boom to a non-tilted position and then retain it in that position. In this way, for example by actuating the boom positioning system the operator automatically has the boom move to the non-tilted position and held there. This is particularly suitable for use when turning on sloped grounds. Holding the boom in a set position will also prevent any gravitational movement of the boom or the pendulum.

In this arrangement again any suitable mechanism may be used to achieve the desired boom positioning and retaining functions.

In a further desirable arrangement it is desirable that where the apparatus has a working mode, for example spraying or cutting, and a non-working mode, that the boom positioning system is actuatable when the apparatus is switched from the working mode to the non-working mode. In particular it is desirable that when the apparatus switches from the working mode to the non-working mode that the boom is automatically moved to the non-tilted position (and further is desirably retained in that position). It is further desirable that when the apparatus switches from the non-working mode to the working mode that the boom is (again desirably automatically) released from the non-tilted position. In this way the boom may be reset to a desired tilted position. The overall effect is that the tilting of the boom to a desired angle for moving in an opposite direction can be achieved with minimum disruptive movement of the pendulum.

Where means are provided for adjusting the angle of the boom relative to the ram said means can be incorporated into the boom positioning system. Again any suitable mechanism may be provided though it is desired that the adjustment means is a powered one.

In general it will be the adjustment means which controls the angle of the boom relative to the pendulum. In any event, it is desirable to have the boom positioning system move the boom to the non-tilted position even if a tilted position is being otherwise maintained by the adjustment means (which may, in at least certain embodiments, not take an active part in the boom positioning system). The non-tilted position of the boom may thus be achieved by the boom positioning system releasing the boom from its position as set by the adjustment system such as where the boom is restrained to the orientation of the mounting portion. In an embodiment where the boom positioning system and the adjustment means are provided as different functions of a unified system the boom positioning system may move the boom to the non-tilted position in an automatic fashion by actuating the adjustment means.

Alternatively the boom positioning system may release the adjustment means so that the position of the boom can be changed without any substantial resistance from the adjustment means. In this embodiment the actuating or adjustment means for adjusting the angle of the boom relative to the pendulum is neutralised (having no power to maintain the angle of the boom relative to the pendulum). This allows the pendulum to remain vertical while the angle of the boom to the pendulum can move by other means.

When the machine is in a position to work again the holding device is disengaged. The boom at this stage is automatically parallel to the crop and back in the working or floating position.

In one arrangement the boom positioning system and the boom adjustment means are interoperable for example part of the same system. Thus for example it is possible for actuation of the boom positioning system to also effect release of the boom by the adjustment means. In one embodiment the adjustment means is hydraulically operated and actuation of the boom positioning system removes the hydraulic pressure from the adjustment means. For example actuation of the boom positioning system may cause a hydraulic power source to the adjustment means to be shut off.

In one particularly desirable arrangement it is desirable that where the apparatus has a working mode, for example spraying or cutting, and a non-working mode (e.g. non-spraying or non-cutting), that the boom positioning system is automatically actuated when the apparatus is switched from the working mode to the non-working mode, and in turn actuation of the boom positioning system automatically isolates the power to the adjustment means. This means that if the working mode of the machine is switched or shut off the boom automatically moves to the non-tilted position. Where the boom positioning system also retains the boom and pendulum against free pendulum movement, then the pendulum and boom are also held against unwanted pendulum swinging motion as the vehicle is turned. This will all automatically occur and the operator does not need to be concerned about the position of the boom of the apparatus.

In one arrangement the boom positioning system comprises a lifting mechanism which is connected to opposing sides of the boom on opposite sides of the pendulum. Lifting action of the lifting mechanism acts to pull the boom to a non-tilted or level position. The lifting mechanism may be loosely connected to the boom, for example with one or more slack ties, while the boom is in its floating or working position. When the boom positioning system is actuated then the boom lifting mechanism pulls on the tie(s) tensioning it or them and in turn acting to move the boom to the desired position such as for example pulling equally on both sides of the boom, so as to move the boom to the desired position.

In one particularly desirable arrangement the machine action is hydraulically driven, while the boom positioning system, the boom angle adjustment mechanism and a mechanism for raising and lowering a vertical support of the mounting portion are all hydraulically powered. In one arrangement the boom positioning system comprises a two-way hydraulic ram which is powered for extension and retraction. Desirably the hydraulic extension supply to the ram is connected to the same hydraulic line as the hydraulic supply for working the machine. While the machine is working the hydraulic power in the line is taken off to a large extent by the working of the machine. Generally the residual pressure in the line is not sufficient to extend the two-way ram. When the machine is stopped the hydraulic power available to extend the ram is much increased and becomes sufficient to extend the ram so as to move the boom to the non-tilted position.

Furthermore it is desirable in certain constructions that in response to the boom positioning system being actuated that the hydraulic supply to the angle adjustment mechanism is cut off. Desirably the other (retraction) side of the two-way hydraulic ram shares a common hydraulic source with the mechanism for lowering and raising a vertical support part of the mounting frame (generally this mechanism will be for height adjustment of the boom). Generally the pressure experienced in that line will be sufficient to cause retraction of the ram when lower extension pressure is acting to extend the ram such as when the hydraulic power to power the machine is been taken off and the machine is in operation. This simple hydraulic configuration can allow for automatic boom positioning when the machine is powered off from working.

The invention extends to an agricultural apparatus, a stabilising system a release system, a retaining system and a boom positioning system as illustrated in the accompanying drawings.

BRIEF DESCRIPTION OF THE DRAWINGS

FIG. 3 is a schematic representation of a combined stabilising and release system in a (first) rest position;

FIG. 4 is a schematic representation of a combined stabilising and release system in a (second) folded back position;

DETAILED DESCRIPTION OF THE DRAWINGS

The various aspects of the present invention will now be described with reference to the accompanying drawings.

Figure 1:
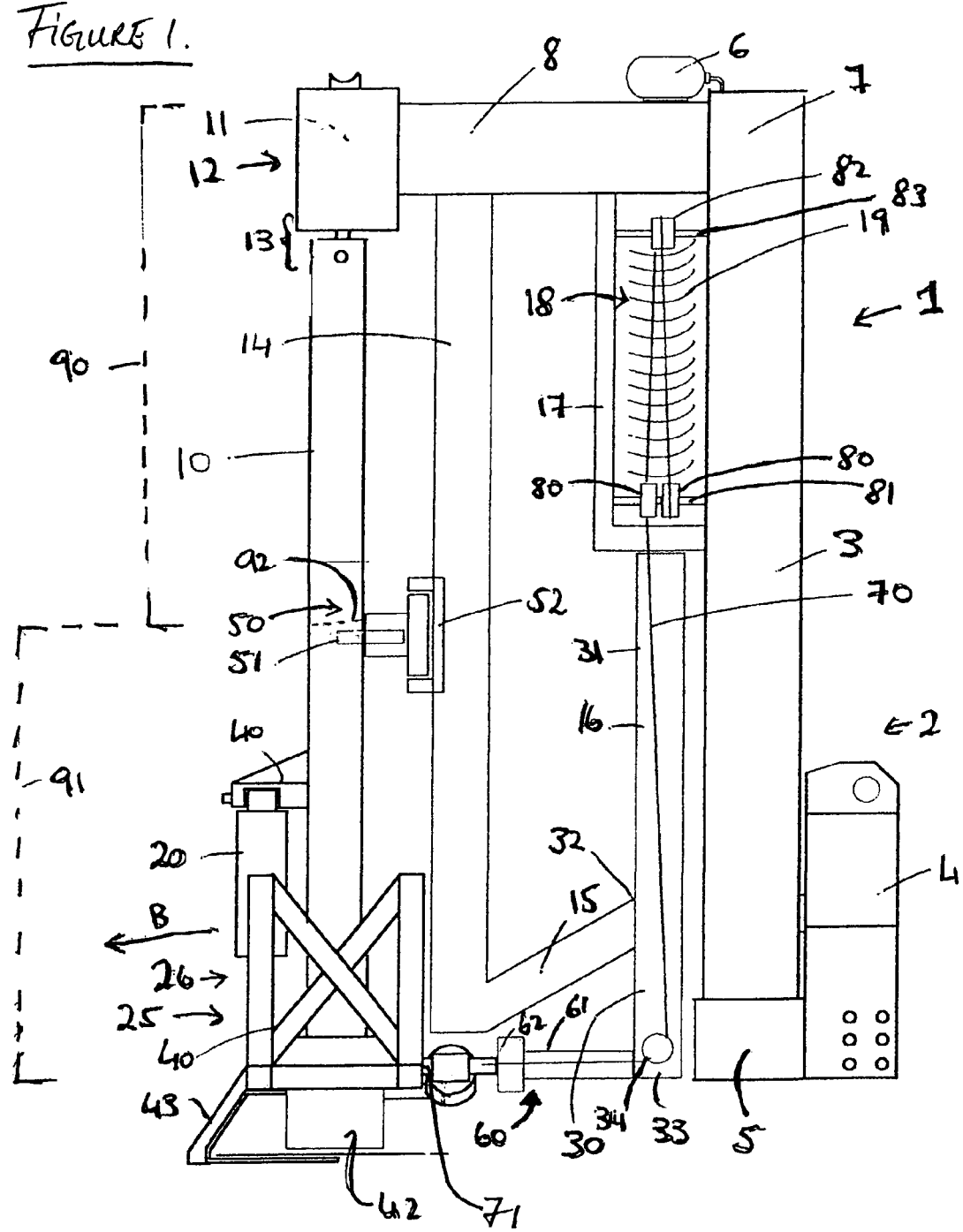
FIG. 1 is a side (part-sectional) view of an apparatus of the invention and incorporating the additional aspects of the invention, namely the stabilising system and the release system—the arms of the boom have been removed for ease of illustration.
Figure 2:
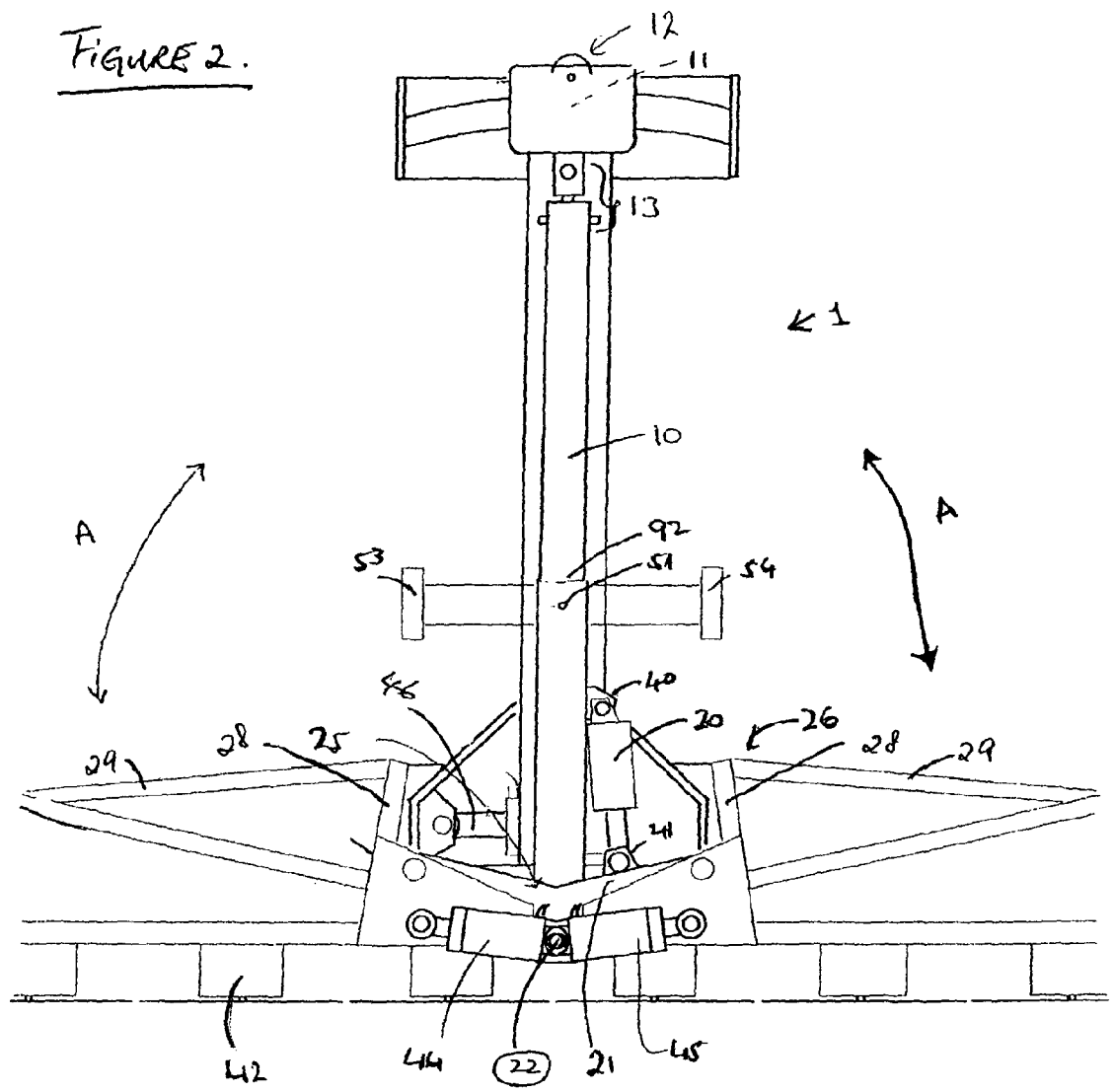
FIG. 2 is a front perspective view of the apparatus of FIG. 1—with the arms in place.

With reference to FIGS. 1-4, in particular FIGS. 1-2, an agricultural apparatus 1 is illustrated. The apparatus 1 is of the type which comprises a mounting portion 2 which includes at least one vertical support 3. The mounting portion 2 has a 3-point linkage part 4 which allows for the attachment of the apparatus 1 to the 3-point linkage part of a tractor. The apparatus 1 may be attached to the front or the rear of the tractor.

The vertical support 3, at a lower end 5 thereof, is pivotally mounted to the 3-point linkage part 4 as described in PCT/IE02/00097. The vertical support 3 is height adjustable relative to the linkage part 4 by a hydraulic ram held internally within the support 3 and the support 3 can extend telescopically. An accumulator 6, hydraulically connected to the internal ram, provides a hydraulic spring or damper for shocks to the vertical support 3.

The vertical support 3 has mounted thereon, at an upper end 7 thereof, a supporting member or spar 8. The supporting member 8 is arranged generally perpendicular to the supporting member 7 in a generally horizontal orientation.

A pendulum 10 is suspended from a first end 11 thereof from the support 7, by an arched roller arrangement 12. A first pivotal coupling 13 is provided between the part of the pendulum attaching to the arched roller arrangement and the remainder of the pendulum. The pivotal coupling 13 allows the arched roller arrangement 12 to follow its path.

At the (second) lower end 25 of the pendulum 10 is a boom 26. The boom 26 is pivotally attached to the lower end 25 of the pendulum 10.

As best seen in FIG. 2, an adjustment mechanism in the firm of a hydraulic ram 20 is mounted between a bracket 40 on the pendulum 10 and a bracket 41 on a carrier arm 21 which forms part of the boom 26. This ram may be utilised to adjust the angle of the boom 26 relative to the pendulum, which is useful where, for operational reasons it is not desired to have the boom perpendicular to the pendulum.

The boom 26 has support members 28 on which boom arms 29 are located (See FIG. 2). Cutting heads 42 are provided on the boom for topping operations and the like. A guard 43 for the cutting elements is provided (see FIG. 1).

Also provided on the boom 26 are two rams 44,45 which are connected between the pendulum 10 and the arms 41 each of which can be employed to raise or lower a respective arm as indicated by arrow A. In this way the arms 41 can be folded up and back toward the pendulum 10. In the embodiment shown the vertical support 7 is pivotable (at the lower end thereof) to the mounting portion 3. A ram 46 may be employed to move the vertical support 7 relative to the mounting portion. It will be appreciated that the vertical support is for supporting the pendulum in a vertical or substantially vertical position so as to allow the pendulum to hang freely. Any support, such as a frame which may include cross members, which allows such support is considered a vertical support.

A second vertical support 14, forming part of the mounting portion, is provided and is attached to the spar 8 and by an angled support member 15 to further hollow member 16. The member 16 forms part of a tension/tie guide system which comprises an angled bracket 17 which forms a housing 18 for a compression spring 19 which is fixed within the housing. The hollow member 16 has an inverted Y-shape with each limb 30 extending (transversely) outwardly from a stem part 31 at the junction 32 of members 15 and 16. At the lower ends 33 of the Y-shaped member 16 and located internally therein are pulleys 34. The lower ends 33 are therefore located on opposing sides of the pendulum 10.

Also provided on the support 14 is a combined pendulum pivot and release pivot 50. Combining the pendulum pivot 51 and the (double) release pivot 52 in this way is another aspect of the present invention.

It is to be noted that the arched roller arrangement 12 and the pendulum pivot 51 are arranged to cooperate so as to allow gravitational swinging of the pendulum 10 by simultaneous arched roller arrangement movement and pivoting about the pendulum pivot 51. In this respect the pivot 51 is fixed and only moves with the pendulum when the release mechanism operates as will be described in more detail below with reference to FIGS. 3 and 4.

As best seen from FIG. 1 a stabilising system is shown which comprises a rigid damper 60 which has a shaft in the form of a hollow spacer 61 which is dimensioned so that a male part thereof (one end thereof) is dimensioned to be received within a female receiver part 62. The male and female parts are arranged so as to form an articulated coupling. The female part 62 is connected to the boom 26. As can be seen a tie in the form of a length of cable 70 is connected at one end 71 to one side of the boom 26 and at the other end 72 also to the boom 26 (see FIG. 3) and in particular respective ones of the left and right arms 41 (and indeed on opposing sides of the pendulum). In particular the female receiver part is made of a resiliently deformable material such as rubber and can thus act as a flex coupling by flexing as the male part articulates (radially about 360°) within it. The articulated coupling acts as a damper to stabilise the boom against disruptive forces, as the resistance to movement of the spacer 61 within the receiver 62 increases as the angle of movement increases. Normal operation will not generally be interfered with, while larger angular movements of the spacer 61 (caused by relatively large arc movement of the boom due to disruptive forces) are damped more heavily and quickly.

The stabilising system in the embodiment shown further includes a pair of pulley wheels 80 mounted on a common axle mount 81 within the housing 18. A further pulley 82 is mounted on movable axle mount 83. The pulley 82 and the mount 83 are arranged to impart compressive force in the cable 70 (in response to movement of the arms 41 due to operation of the release mechanism) to the spring 19—thus compressing spring 19.

As can be seen from FIGS. 1, 3 and 4 the cable 70 runs from the boom 26, and in particular one arm 41 thereof, through the female part 62 and the spacer 61 up the limb 30 of Y-shaped piece 16, through the stem part 31 thereof, about one of the pulleys 80 through to the pulley 82 and back in a mirror image arrangement (through the other pulley 80) to the other arm 41 of the boom 26.

It will be noted that the damper is created in part by the retention of the male part of shaft 61 in receiver 62 and in part by flexing of the cable 70 on which the spacer 61 is mounted. This retention is due in part to the cable 70 as the shaft 61 is a rigid hollow sleeve that is not fixed at either end. It will be appreciated that a second female receiver could be provided at the end 33 of the limb 30 for each damper arrangement.

It is also to be noted at this stage that the pendulum 10 has as an upper part 90 and a lower part 91 which can twist (break-away) with respect to each other about a hinge line 92.

As will be explained now with reference to FIGS. 3 and 4 the release system operates as follows.

In the schematic representations of FIGS. 3 and 4 it is assumed that the right arm 41 has been subjected to a resistance force above the threshold of the release system in the direction indicated by arrow B. At this point it is worth noting that the mounting frame 4, the upright 3 including spar 8, and supports 14, 15, Y-shaped member 16, and upper portion 90 of pendulum 10, all remain in the same relative position, while lower portion 91 of pendulum 10 and the boom 26 are carried with lower portion 91 and move in response to the action of the release mechanism.

The pendulum pivot 51 is carried on a support plate 55 by a pivot mount 56. When the release mechanism is activated the cable 70 is subjected to increased tension from the boom which is transmitted along the cable path described above to the spring 19 causing compression of the spring 19 because of movement of pulley 82 and its mount 83.

Simultaneously the double release pivot opens on side 54 thereof, causing the lower portion 91 of the pendulum 90 to "break-away" from the remainder of the apparatus. It will be seen that the pendulum pivot 51 moves away with this action, as of course does the boom 26 and the right arm 41. Once the force is removed the double pivot 52 closes and the release mechanism is closed automatically (in the direction of arrow C) by the restorative tension of the spring 19. In the same way if the left side of the boom is subjected to sufficient force, it too will break-away in an analogous fashion due to opening of the double pivot 52 about side 53.

Articulation of the spacers 61 can occur by flexing of the receivers 62 about the spacer 61 as indicated by arrows D in FIG. 3.

Figure 5:
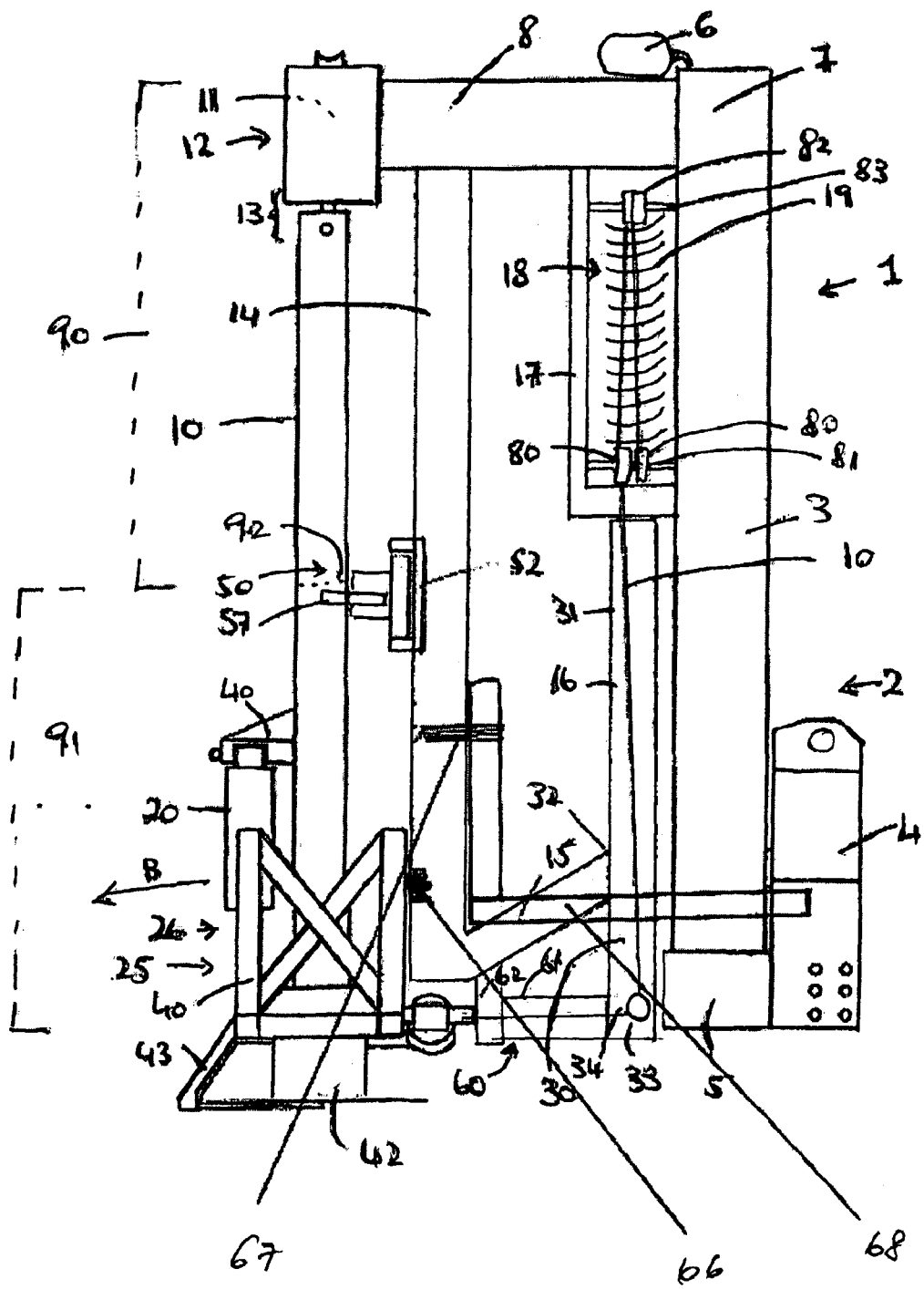
FIG. 5 is a side (part-sectional) view of the apparatus of further incorporating a holding system according to the invention.
Figure 6:
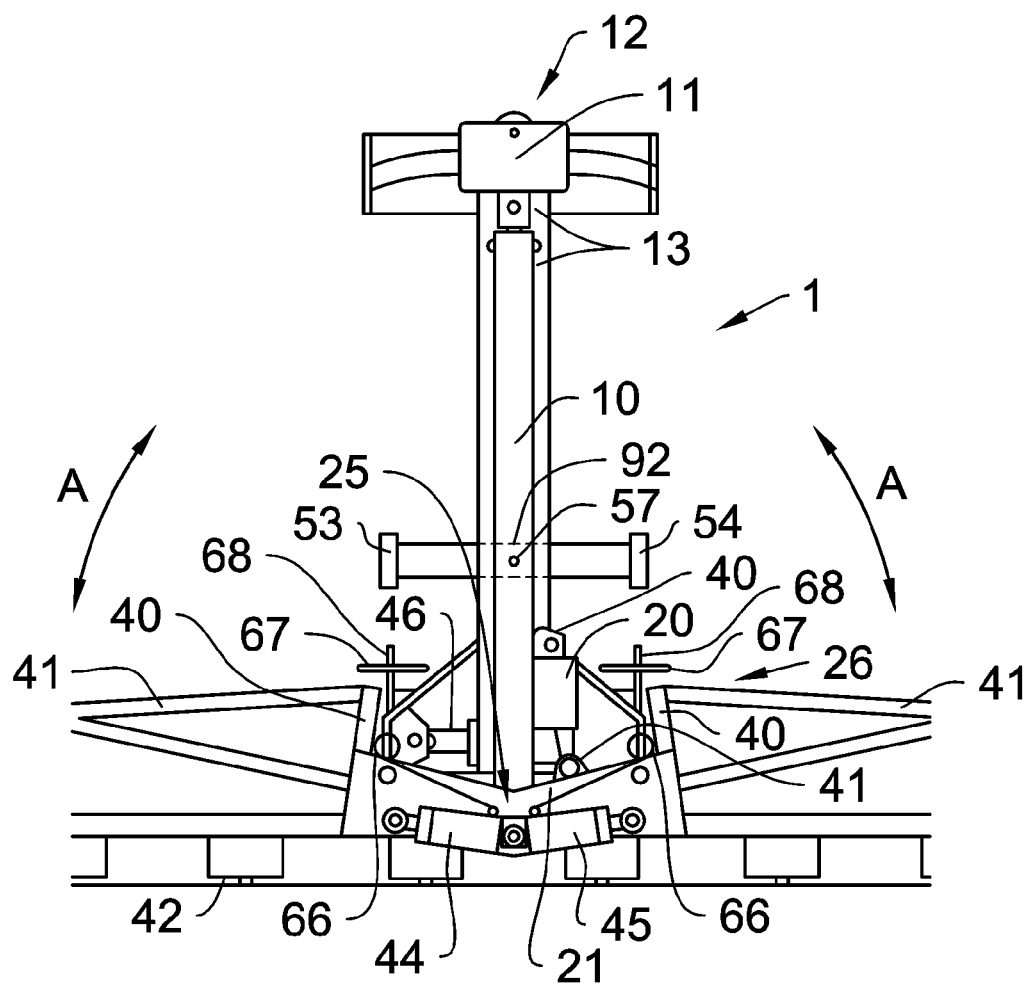
FIG. 6 is a front perspective view of the apparatus of FIG. 5.

The drawings in particular FIG. 5 and FIG. 6 show a holding system 65, for an agricultural apparatus 1 which has a boom stop. The apparatus 1 is generally of the same construction as that shown in earlier Figures but incorporating the holding system. The agricultural apparatus 1 having a mounting (frame or) portion 2 for mounting the apparatus to a vehicle and a free hanging pendulum 10 mounted on the mounting portion and a boom 26, which is pivotally mounted to the pendulum at a pivot point 22 so as to allow pivoting of the boom relative to the pendulum. The holding system 65 comprising at least one roller or pivot type mechanism 66 carried on either the boom or the mounting frame that connects to a holding or receptive type mechanism 67 on the opposite side thus connecting the frame to the boom and allowing the boom to move parallel to (with) the frame holding the boom and restricting its movement in any other direction when the apparatus is not cutting or spraying.

The holding system just described may comprise a holding mechanism which consists of a roller type mechanism 66 on the boom, when the holding system is activated this roller type mechanism comes into contact with a holding type device 67 carried on the frame thus connecting the boom to the frame and only allowing the boom to freely move parallel to the frame. Additionally the invention relates to an apparatus wherein the holding device comprises of a linkage type mechanism connected to either the boom or the frame (see reference to FIG. 8 below). This linkage system can come into contact with and interact with a holding or rigid type structure on the other side thus connecting the boom to the frame allowing only parallel movement of the boom relative to the frame. The invention further provides the option wherein the holding device when activated, the ram or actuation means of changing the angle of the boom relative to the pendulum is deactivated. This allows the frame that is now connected to the boom, to determine the angle of the boom relative to the pendulum.

In FIGS. 5 and 6 the apparatus is of the type, which comprises a carrier frame (or 3 point linkage part) and a vertical support 3 that is height adjustable. This vertical support carries a pendulum type mechanism 10, which carries the boom 26, which is pivotally connected to the pendulum 10. A ram or actuation means 20 to adjust the boom relative to the pendulum.

In FIGS. 5 and 6 the roller type mechanism 66 is carried on the boom 26. The holding mechanism 67 is carried on a support 68, which is mounted on the carrier frame 4. As best seen from FIG. 6 there is a roller and a holding mechanism on either side of the arm. When the boom is raised the rollers 66 are arranged to abut the respective holding mechanisms 67 which then maintain the boom 26 in a substantially horizontal orientation.

Figure 7:
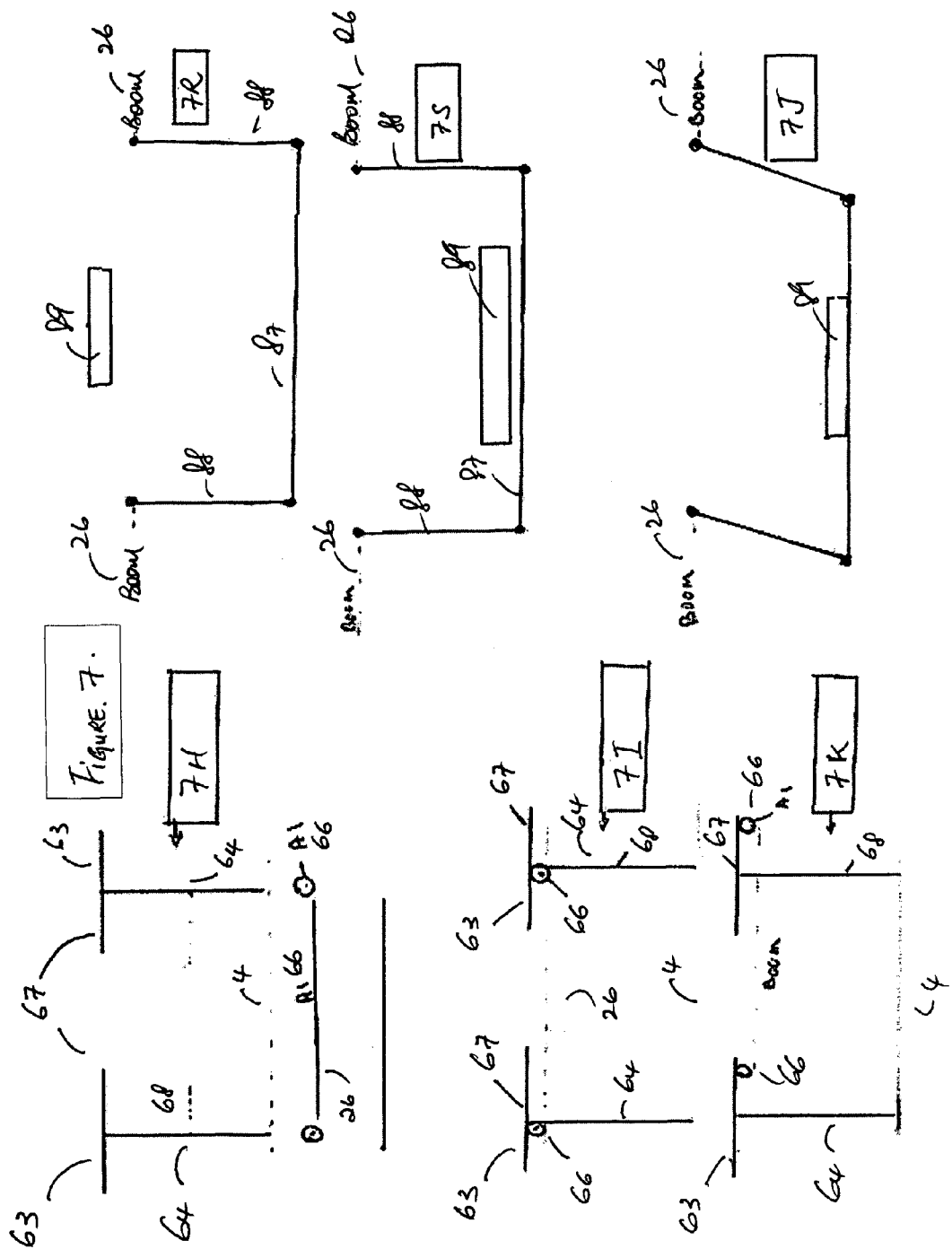
FIGS. 7H-K and 7R-S are schematic diagrams of different embodiments of the holding system of the invention and showing the different positions of the holding system and also a possible linkage system.

FIG. 7 (FIG. 7I and FIG. 7K) show schematically (holding positions where) the roller mechanism 66 comes into contact with the holding mechanism 67. The working position is shown in FIG. 7H where the roller mechanism 66 is spaced (in a vertical direction) from the holding mechanism 67 (which in the embodiment shown is a T-shaped part.) In the engaged position of FIGS. 7I and 7K the roller 66 has come into contact (by movement of the boom 26 in the direction of the arrow D) with a cross piece 63 on the stem 64 of the T-shaped piece (see also FIGS. 5 and 6). This restrains the boom 26 from moving up any further (as the roller 66 is on the boom) than the holding mechanism but allows the boom to move transverse to the direction of travel i.e. the boom to move left to right as in (a comparison between) FIG. 7I and FIG. 7K (will show) but only parallel to the carrier frame 4 which carries the support 68 or parallel to the holding mechanism 66. In other words the rollers 66 can run over and back on the cross pieces 63.

In this embodiment when the roller mechanism 66 comes into contact with the holding mechanism 67 the ram 20 is deactivated and is allowed to move freely in or out, allowing the angle of the boom to the pendulum to be changed by the roller mechanism 66 running in the holding mechanism 67. This movement is illustrated by the positional change of the boom shown between FIGS. 7I and 7K.

Also in FIG. 7 are diagrams 7R, 7S and 7J. These show another possible embodiment using pivot points or linkage system. In the holding position in fig S & fig J the boom is allowed to move parallel to the frame. In particular in the embodiment the boom 26 is attached to a rigid member 87 via two ties or linkages 88. A stop or abutment portion 89 is provided. In FIG. 7R the working or floating position is shown where the boom moves freely. In FIGS. 7S and 7J the boom has been moved vertically upwardly and the rigid member 87 abuts the stop 89. In that position the ties 88 hold the boom 26 against movement in a vertical direction, but as illustrated best by FIG. 7J allow movement of the boom 26 in the transverse direction.

FIGS. 5 to 7 show a holding or retaining system for an agricultural apparatus 1, the agricultural apparatus having a mounting portion (mounting frame) 4 for mounting the apparatus to a vehicle; a pendulum 10 mounted on the mounting portion (mounting frame); and a boom which is pivotally mounted to the pendulum at a pivot point so as to allow pivoting of the boom relative to the pendulum, and retaining means for (connecting and) holding the boom to the mounting portion (mounting frame) restricting free movement of the boom. In the embodiments shown the roller and holder arrangement form the retaining means.

Figure 8:
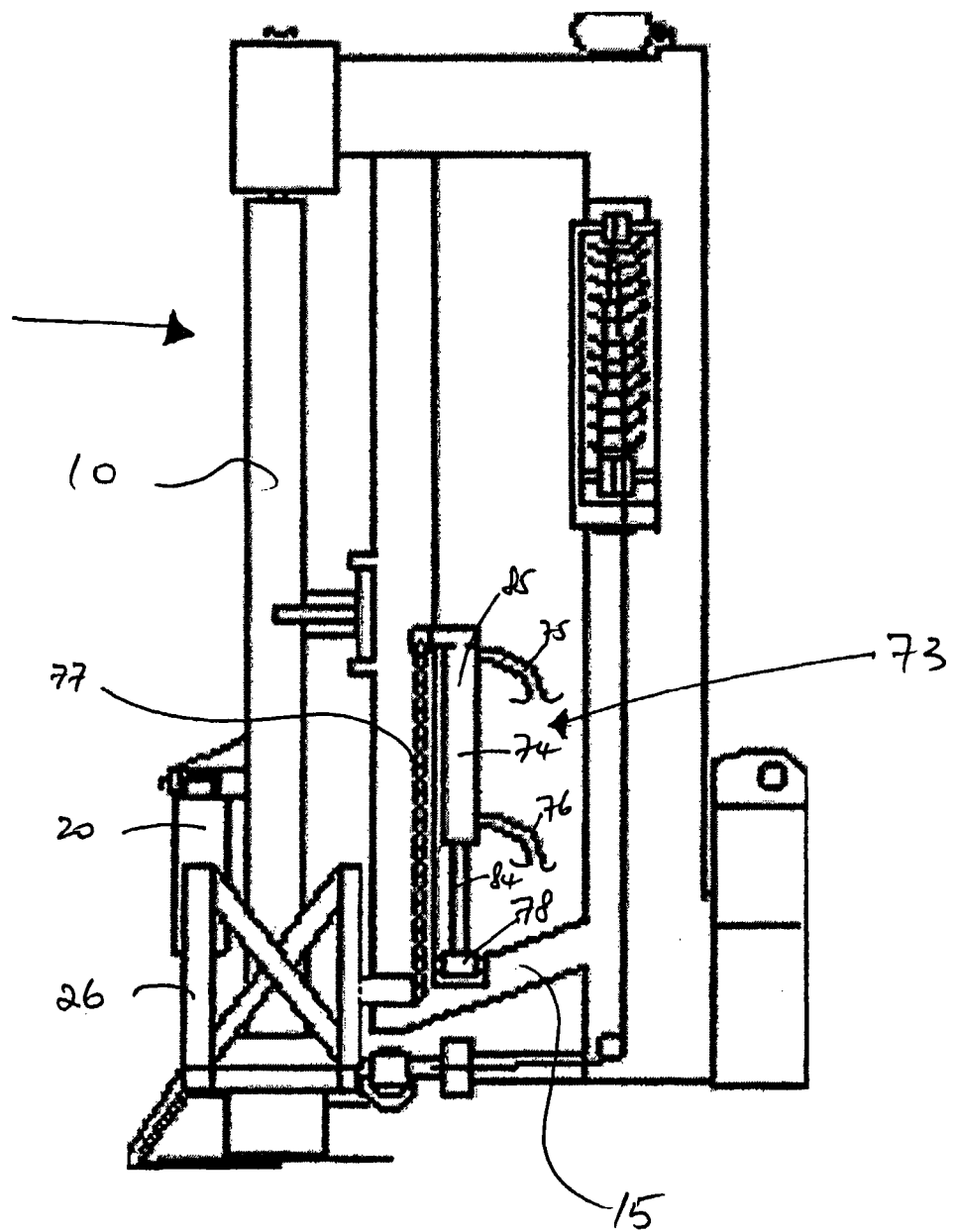
FIG. 8 shows a side view of an apparatus according to the present invention similar to that shown in FIG. 1 and including a boom positioning system.

FIG. 8 shows a holding or retaining system for an agricultural apparatus which is also a boom positioning system within the present invention.

In particular the apparatus 1 is of the type described in FIGS. 1 to 4. Additionally the apparatus is provide with a mechanism or system 73 which operates as both a boom positioning system and a holding or retaining system for the boom. The embodiment is particularly desirable as the mechanism does not interfere with the damper or release arrangements which also form part of the apparatus as described previously.

In particular the mechanism 73 for actuation of the boom positioning system to also effect release of the boom by the adjustment means in the form of the adjustment ram 20 by removing the hydraulic pressure from the adjustment means. In the embodiment the operation of the mechanism 73 shuts off a valve controlling the hydraulic feed to the ram 20. In one embodiment the ram 20 has a pressure release which is operable when the valve is shut off, for example hydraulic fluid in the ram 20 can be released to another chamber in the ram so that there is no retained hydraulic pressure which will prevent operation of the system 73. In this respect the boom positioning system can easily overcome any minor hydraulic fluid resistance in the ram 20 due to residual pressure, as the non-pressurised hydraulic fluid will not resist to any substantial degree movement of the ram 20 by the boom positioning system.

For example actuation of the boom positioning system may cause a hydraulic power source to the adjustment means to be shut off. Desirably the hydraulic power to the ram 20 is shut off when the apparatus is switched from the working mode to the non-working mode e.g. by a valve mechanism.

The system 73 is automatically actuated when the apparatus is switched from the working mode to the non-working mode, and in turn actuation of the boom positioning system automatically isolates the power to the adjustment means as described above. This means that if the working mode of the machine is switched or shut off the boom 26 automatically moves to the non-tilted position. In the embodiment the system 73 will also retain the boom and pendulum against free pendulum movement. This will all automatically occur and the operator does not need to be concerned about the position of the boom of the apparatus.

In the embodiment the system 73 comprises a lifting mechanism which in the embodiment comprises a two-way hydraulic ram 74 (mounted at the lower end 78 on the angled support member 15) which is powered for extension (through feed 75) and retraction (by retraction feed 76). The ram 74 is connected (at an upper end 79 thereof) to opposing sides of the boom 26 on opposite sides of the pendulum 10. Lifting action (extension) of the ram 74 acts to pull the boom 26 to a non-tilted or level position as the ram 74 is connected to the boom 26 with two ties in the form of chains 77. In the embodiment as shown, the chains 77 are taut as the ram 74 is extended with the piston 84 in the extended position extending almost fully out of the cylinder 85. The chains 77 will be slack while the boom is in its floating or working position (and the piston 84 is retracted into the cylinder 85) and therefore do not interfere with the normal pendulum action of the boom/pendulum. When the system 73 is actuated then the boom lifting mechanism pulls on the chains 77 tensioning them (the tensioned position is shown in FIG. 8) and in turn acting to move the boom to the desired position by pulling equally on both sides of the boom, so as to move the boom to the desired position. As long as that position is maintained the boom will be held in the desired position.

In the embodiment the machine action is hydraulically driven, the boom positioning system, the boom angle adjustment mechanism and a mechanism for raising and lowering a vertical support of the mounting portion are all hydraulically powered. The hydraulic extension supply 75 to the ram is connected to the same hydraulic line as the hydraulic supply for working the machine. While the machine is working the hydraulic power in the line is taken off to a large extent by the working of the machine. Generally the residual pressure in the line is not sufficient to extend the two-way ram. When the machine is stopped the hydraulic power available to extend the ram 74 is much increased and becomes sufficient to extend the ram so as to move the boom to the non-tilted position. It will be appreciated that while the ram 74 is extended the mechanism will retain the boom and pendulum against pendulum motion. Furthermore the release mechanism can operate whether or not the boom positioning system is activated (such as in FIG. 8) or is not activated as the boom positioning system allows for movement of the arms of the boom in the release direction.

Figure 9:
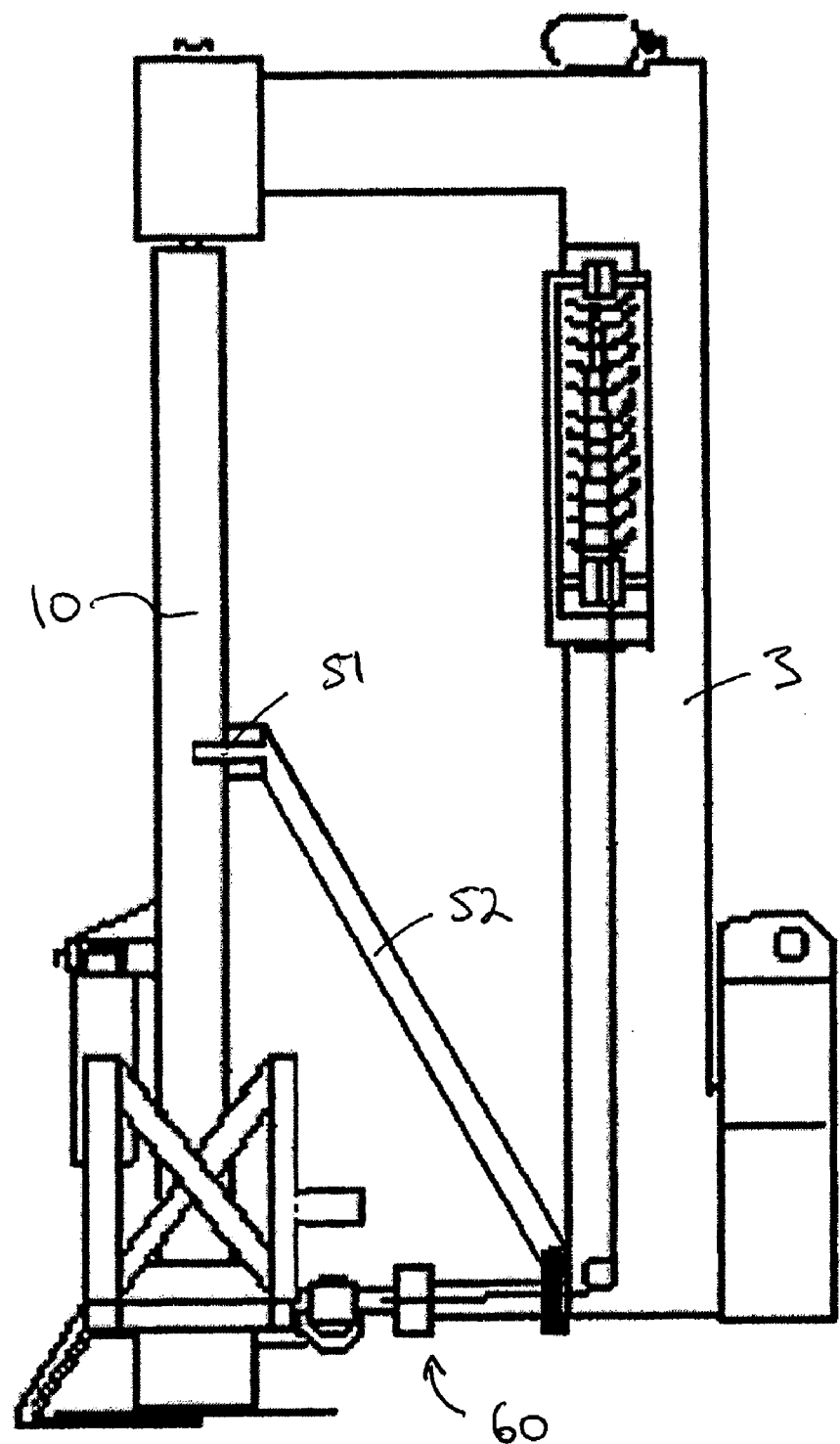
FIG. 9 is a side view of an apparatus of similar construction to FIG. 1 incorporating a different support mechanism for the pendulum pivot.

In the embodiment the retraction supply 76 side of the two-way hydraulic ram shares a common hydraulic source with the mechanism for lowering and raising a vertical support part of the mounting frame. Generally the pressure experienced in that line will be sufficient to cause retraction of the ram when lower extension pressure is acting to extend the ram such as when the hydraulic power to power the machine is been taken off and the machine is in operation. This simple hydraulic configuration can allow for automatic boom positioning when the machine is powered off from working. FIG. 9 illustrates an embodiment where two dampers 60 are provided (again on opposing sides of the pendulum 10) a rigid member 52 extends from the pendulum pivot 51 to each damper 60 thus (indirectly) connecting the pendulum pivot to mounting portion 4 for example the vertical support 3 thereof. The rigid members 52 may be joined to form a frame which connects the pivot to the damper(s) and additionally or alternatively to any other point of the vertical support. In this way the pendulum pivot is provided between the pendulum and its supporting frame.

Figure 10:
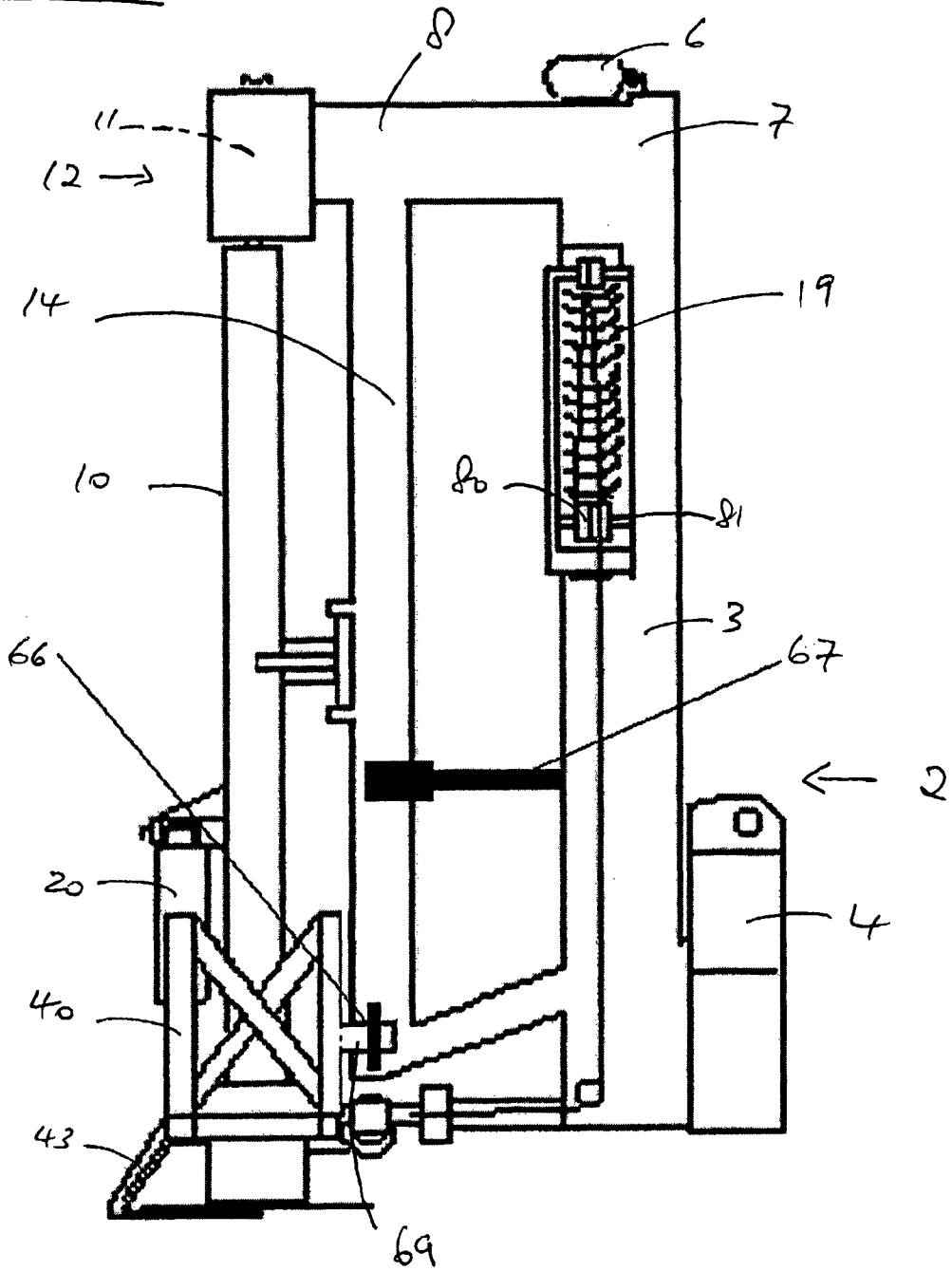
FIG. 10 is a side view of an apparatus of similar construction to FIG. 1 incorporating a holding system according to a different aspect of the present invention.

FIG. 10 illustrates an alternative embodiment of a holding mechanism according to one aspect of the present invention of an apparatus which is similar in construction to that shown in all previous Figures. In particular, the holding mechanism 67 is a bracket on the mounting portion 4 which extends toward the boom. In operation the roller mechanism has the roller 66 which is pivotally mounted on pivot 69 which will, when the boom is lifted to a desired height (for example above any conventional operating height) abut the bracket 67. As a similar mechanism is provided on each side of the boom it is leveled out in this way.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. A stabilizing and release system for an agricultural apparatus, said stabilizing and release system comprising:
    a mounting portion for mounting said agricultural apparatus to a vehicle;
    a pendulum having first and second ends mounted on said mounting portion;
    a boom which is pivotally mounted to said pendulum at a pivot point so as to allow pivoting of said boom relative to said pendulum;
    a stabilizing system adapted to stabilize said boom against movement imparted to said boom by disruptive forces which disturb a natural position of the boom determined by gravity;
    a release system for releasing said boom from a first position to a second position when said boom encounters a resistance to movement above a predetermined resistance threshold; and
    an automatic boom positioning means.

2. The stabilizing and release system as set forth in claim 1 further comprising a retaining means for holding said boom to said mounting portion restricting free movement of said boom.

3. The stabilizing and release system as set forth in claim 1, wherein said automatic boom positioning means arranged, when actuated in use, where said boom is in a boom tilted position in which position said boom is not perpendicular to either of said pendulum or said mounting portion, to bring said boom from said boom tilted position to a boom non-tilted position where said boom is substantially perpendicular to said mounting portion.

4. The stabilizing and release system as set forth in claim 1, wherein said stabilizing system comprising a rigid damper arranged between a support frame and said boom and arranged to damp relative movement of said boom and said mounting portion caused by said disruptive forces, said damper including at least one articulated coupling which allows said damper to articulate with respect to at least one of said mounting portion and said boom so that said damper can follow the motion of said boom.

5. The stabilizing and release system as set forth in claim 4, wherein said damper comprises a rigid shaft which is free to articulate at one or both ends thereof.

6. The stabilizing and release system as set forth in claim 4, wherein said damper is extendable so that said damper is adjustable between a first position and a second position.

7. The stabilizing and release system as set forth in claim 4, wherein said release system comprising a release pivot between said boom and said mounting portion for allowing said boom to move from a first position to a second position about said release pivot, and a release coupling for holding said boom in said first position until said pre-determined resistance threshold is reached.

8. The stabilizing and release system as set forth in claim 7, wherein said release coupling comprises a tensioned tie running in a guide element and acting between said boom and said mounting portion and being arranged to allow said boom to move about said release pivot into said second position by allowing additional tie length when said pre-determined resistance threshold is reached.

9. The stabilizing and release system as set forth in claim 2 further comprising a means for adjusting the angle of said boom relative to said pendulum, said means for adjusting the angle of said boom comprises at least one hydraulic ram so that the angle of said boom relative to said pendulum can be adjusted in a controlled manner.

10. The stabilizing and release system as set forth in claim 9, wherein said retaining means holds said boom in the second position with minimum interference to said pendulum.

11. A stabilizing and release system comprising:
    a mounting portion for mounting said agricultural apparatus to a vehicle;
    a pendulum having first and second ends mounted on said mounting portion;
    a boom which is pivotally mounted to said pendulum at a pivot point so as to allow pivoting of said boom relative to said pendulum;
    a stabilizing system adapted to stabilize said boom against movement imparted to said boom by disruptive forces which disturb a natural position of the boom determined by gravity;
    a release system for releasing said boom from a first position to a second position when said boom encounters a resistance to movement above a predetermined resistance threshold;
    a pendulum pivot arranged at a position between said first and second ends of said pendulum which pivotally connects said pendulum to a support frame of said stabilizing system, wherein an arched roller arrangement and said pendulum pivot being arranged to cooperate so as to allow gravitational swinging of said pendulum by simultaneous arched roller arrangement movement and pivoting about said pendulum pivot; and
    an automatic boom positioning means arranged, when actuated in use, where said boom is in a boom tilted position in which position said boom is not perpendicular to either of said pendulum or said mounting portion, to bring said boom from said boom tilted position to a boom non-tilted position where said boom is substantially perpendicular to said mounting portion.

12. The stabilizing and release system as set forth in claim 11, wherein said stabilizing system comprising a rigid damper arranged between a support frame and said boom and arranged to damp relative movement of said boom and said mounting portion caused by said disruptive forces, said damper including at least one articulated coupling which allows said damper to articulate with respect to at least one of said mounting portion and said boom so that said damper can follow the motion of said boom.

13. The stabilizing and release system as set forth in claim 12, wherein said damper comprises a rigid shaft which is free to articulate at one or both ends thereof, and wherein said damper is extendable so that said damper is adjustable between a first position and a second position.

14. The stabilizing and release system as set forth in claim 13, wherein said stabilizing system comprises an additional damper, and wherein said dampers are provided on opposing sides of said pendulum.

15. The stabilizing and release system as set forth in claim 12, wherein said release system comprising a release pivot between said boom and said mounting portion for allowing said boom to move from a first position to a second position about said release pivot, and a release coupling for holding said boom in said first position until said pre-determined resistance threshold is reached.

16. The stabilizing and release system as set forth in claim 15, wherein said release coupling comprises a tensioned tie running in a guide element and acting between said boom and said mounting portion and being arranged to allow said boom to move about said release pivot into said second position by allowing additional tie length when said pre-determined resistance threshold is reached.

17. The stabilizing and release system as set forth in claim 11 further comprising a means for adjusting the angle of said boom relative to said pendulum, said means for adjusting the angle of said boom comprises at least one hydraulic ram so that the angle of said boom relative to said pendulum can be adjusted in a controlled manner.

18. The stabilizing and release system as set forth in claim 17 further comprising a retaining means which holds said boom in the second position with minimum interference to said pendulum.

19. The stabilizing and release system as set forth in claim 18, wherein said retaining means holds said boom to said mounting portion restricting free movement of said boom.

20. A stabilizing and release system comprising:
- a mounting portion for mounting said agricultural apparatus to a vehicle;
- a pendulum having a first end mounted on said mounting portion;
- a boom which is pivotally mounted to said pendulum at a pivot point so as to allow pivoting of said boom relative to said pendulum;
- a stabilizing system adapted to stabilize said boom against movement imparted to said boom by disruptive forces which disturb a natural position of the boom determined by gravity, said stabilizing system comprising a rigid damper arranged between a support frame and said boom and arranged to damp relative movement of said boom and said mounting portion caused by said disruptive forces, said damper including at least one articulated coupling which allows said damper to articulate with respect to at least one of said mounting portion and said boom so that said damper can follow the motion of said boom
- a release system for releasing said boom from a first position to a second position when said boom encounters a resistance to movement above a predetermined resistance threshold, said release system comprising a release pivot between said boom and said mounting portion for allowing said boom to move from a first position to a second position about said release pivot, and a release coupling for holding said boom in said first position until said pre-determined resistance threshold is reached;
- a pendulum pivot arranged at a position between said first and second ends of said pendulum which pivotally connects said pendulum to said support frame of said stabilizing system, wherein an arched roller arrangement and said pendulum pivot being arranged to cooperate so as to allow gravitational swinging of said pendulum by simultaneous arched roller arrangement movement and pivoting about said pendulum pivot;
- an automatic boom positioning means arranged, when actuated in use, where said boom is in a boom tilted position in which position said boom is not perpendicular to either of said pendulum or said mounting portion, to bring said boom from said boom tilted position to a boom non-tilted position where said boom is substantially perpendicular to said mounting portion with minimum interference with said pendulum; and
- a retaining means for holding said boom to said mounting portion restricting free movement of said boom.

* * * * *